US011623372B2

(12) United States Patent
Moran et al.

(10) Patent No.: US 11,623,372 B2
(45) Date of Patent: Apr. 11, 2023

(54) MONOLITHIC THERMOCASTING OF POLYMER MIXTURES FOR ARCHITECTURAL APPLICATIONS

(71) Applicant: THE REGENTS OF THE UNIVERSITY OF MICHIGAN, Ann Arbor, MI (US)

(72) Inventors: Thomas Moran, Ann Arbor, MI (US); Simon Anton, Ann Arbor, MI (US); Rachel Mulder, Ann Arbor, MI (US); Meredith Miller, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 275 days.

(21) Appl. No.: 16/757,827

(22) PCT Filed: Oct. 24, 2018

(86) PCT No.: PCT/US2018/057300
§ 371 (c)(1),
(2) Date: Apr. 21, 2020

(87) PCT Pub. No.: WO2019/084128
PCT Pub. Date: May 2, 2019

(65) Prior Publication Data
US 2021/0187799 A1   Jun. 24, 2021

Related U.S. Application Data

(60) Provisional application No. 62/576,888, filed on Oct. 25, 2017.

(51) Int. Cl.
*B29C 41/04* (2006.01)
*B29C 41/46* (2006.01)
(Continued)

(52) U.S. Cl.
CPC ............ *B29C 41/042* (2013.01); *B29C 41/46* (2013.01); *C08J 3/203* (2013.01); *C08K 3/40* (2013.01);
(Continued)

(58) Field of Classification Search
None
See application file for complete search history.

(56) References Cited

U.S. PATENT DOCUMENTS 5,422,051 A   6/1995 Sawyers
6,034,155 A   3/2000 Espeland et al.
(Continued)

OTHER PUBLICATIONS

International Search Report and Written Opinion of the International Searching Authority issued in PCT/US2018/057300, dated Jan. 11, 2019; ISA/US.

*Primary Examiner* — Arrie L Reuther
(74) *Attorney, Agent, or Firm* — Harness, Dickey & Pierce, P.L.C.

(57) ABSTRACT

A monolithic thermocasting system for thermocasting polymer and solid material and method of use having an internal frame system; an external frame system disposed external to the internal frame system; a mold cavity formed between the internal frame system and the external frame system, the mold cavity sized to receive the polymer and solid material and shaped to form an architectural member; a duct; and a heater element disposed in the duct for outputting thermal energy to the mold cavity to heat the polymer and solid material, the thermal energy being sufficient to thermocast the polymer and solid material to a combined building material.

12 Claims, 5 Drawing Sheets

(51) Int. Cl.
    *C08J 3/20*         (2006.01)
    *C08K 3/40*         (2006.01)
    *C08L 23/06*        (2006.01)
    *C08L 23/12*        (2006.01)
    *B29K 23/00*        (2006.01)
    *B29K 105/26*      (2006.01)
    *B29K 509/06*      (2006.01)
    *B29K 509/08*      (2006.01)
    *B29K 509/00*      (2006.01)

(52) U.S. Cl.
    CPC ............... C08L 23/06 (2013.01); C08L 23/12 (2013.01); *B29K 2023/06* (2013.01); *B29K 2023/12* (2013.01); *B29K 2105/26* (2013.01); *B29K 2509/06* (2013.01); *B29K 2509/08* (2013.01); *B29K 2509/14* (2013.01); *C08J 2323/06* (2013.01); *C08J 2323/12* (2013.01); *C08J 2423/06* (2013.01); *C08J 2423/12* (2013.01); *C08L 2207/20* (2013.01)

(56) References Cited

U.S. PATENT DOCUMENTS

| | | |
|---|---|---|
| 2002/0051834 A1 | 5/2002 | Bauer |
| 2002/0187213 A1* | 12/2002 | Durrant .................. B29C 41/46 425/425 |
| 2006/0249872 A1 | 11/2006 | Manuel et al. |
| 2009/0258192 A1 | 10/2009 | Linares |
| 2015/0083739 A1 | 3/2015 | Flener et al. |

* cited by examiner

MONOLITHIC THERMOCASTING OF POLYMER MIXTURES FOR ARCHITECTURAL APPLICATIONS

CROSS-REFERENCE TO RELATED APPLICATIONS

This application is the U.S. National Phase Application under 35 U.S.C. 371 of International Application No. PCT/US2018/057300 filed on Oct. 24, 2018 which claims the benefit of U.S. Provisional Application No. 62/576,888, filed on Oct. 25, 2017. The entire disclosures of the above applications are incorporated herein by reference.

FIELD

The present disclosure relates to thermocasting and, more particularly, relates to monolithic thermocasting of polymer mixtures for use in architectural applications.

BACKGROUND AND SUMMARY

This section provides background information related to the present disclosure which is not necessarily prior art. This section also provides a general summary of the disclosure, and is not a comprehensive disclosure of its full scope or all of its features.

The annual global production of plastics is estimated to be 245 million metric tons. Despite reuse and recycling efforts, much of this ends up in landfills, and one-tenth enters the world's oceans each year. While curbing this source of pollution is desirable, the reality is that the planet as a closed system presently contains a staggering amount of plastic.

Clastic Order consists of two monolithically thermocast columns, fabricated by the inventors of the present teachings. As prototypes, these columns demonstrate a new process for making full-scale architectural elements from a mixture of recycled polymers and mineral aggregates. This material is modeled after a recently discovered stone called "plastiglomerate," which is "an indurated, multi-composite material made hard by agglutination of rock and molten plastic." Plastiglomerates are appearing in coastal ecosystems across the world; they result from waste plastics entering marine environments and fusing with sand, seashells, and other inorganic objects.

According to the present teachings, techniques and systems are provided for translating this geological phenomenon into a viable construction process. The present teachings provide an environmental strategy for reusing waste materials that are proliferating across the earth's surface and waters and to develop technical solutions for the challenges of building with plastics alone. By monolithically thermocasting a composite material in situ, the present teachings are able to overcome the challenges and difficulties of the prior art.

Plastic waste is abundant, especially in the United States where a decentralized approach to recycling is no match for the sheer volume of plastic consumption. It is also costly to disaggregate post-consumer plastics into types and colors for material reuse and recycling. The fabrication process described herein minimizes the labor-intensive process of separating colors and types of plastic. By sourcing the polymers from nearby waste streams and the mineral component from locally available aggregates, this process reduces the financial burden and carbon footprint of transporting raw materials or finished products.

Currently, plastics are used widely in building construction, but their use is limited to small components such as plumbing, wiring, trim, caulks, and gaskets. Largest scale use of plastics in buildings typically is limited to enclosure systems, such as vinyl or fiber reinforced plastic siding, transparent or translucent panels, and other skin or infill systems. None of these applications are structural, and all rely on other materials or systems to carry loads.

According to the principles of the present teachings, a monolithic thermocasting system for thermocasting polymer and solid material and method of use is provided. In some embodiments, the system has an internal frame system; an external frame system disposed external to the internal frame system; a mold cavity formed between the internal frame system and the external frame system, the mold cavity sized to receive the polymer and solid material and shaped to form an architectural member; a duct; and a heater element disposed in the duct for outputting thermal energy to the mold cavity to heat the polymer and solid material, the thermal energy being sufficient to thermocast the polymer and solid material to a combined building material. In some embodiments, a thermocasting system is provided having a manipulating device to rotate the mold cavity simultaneously with the heating elements thereby thermocasting the polymer and solid material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
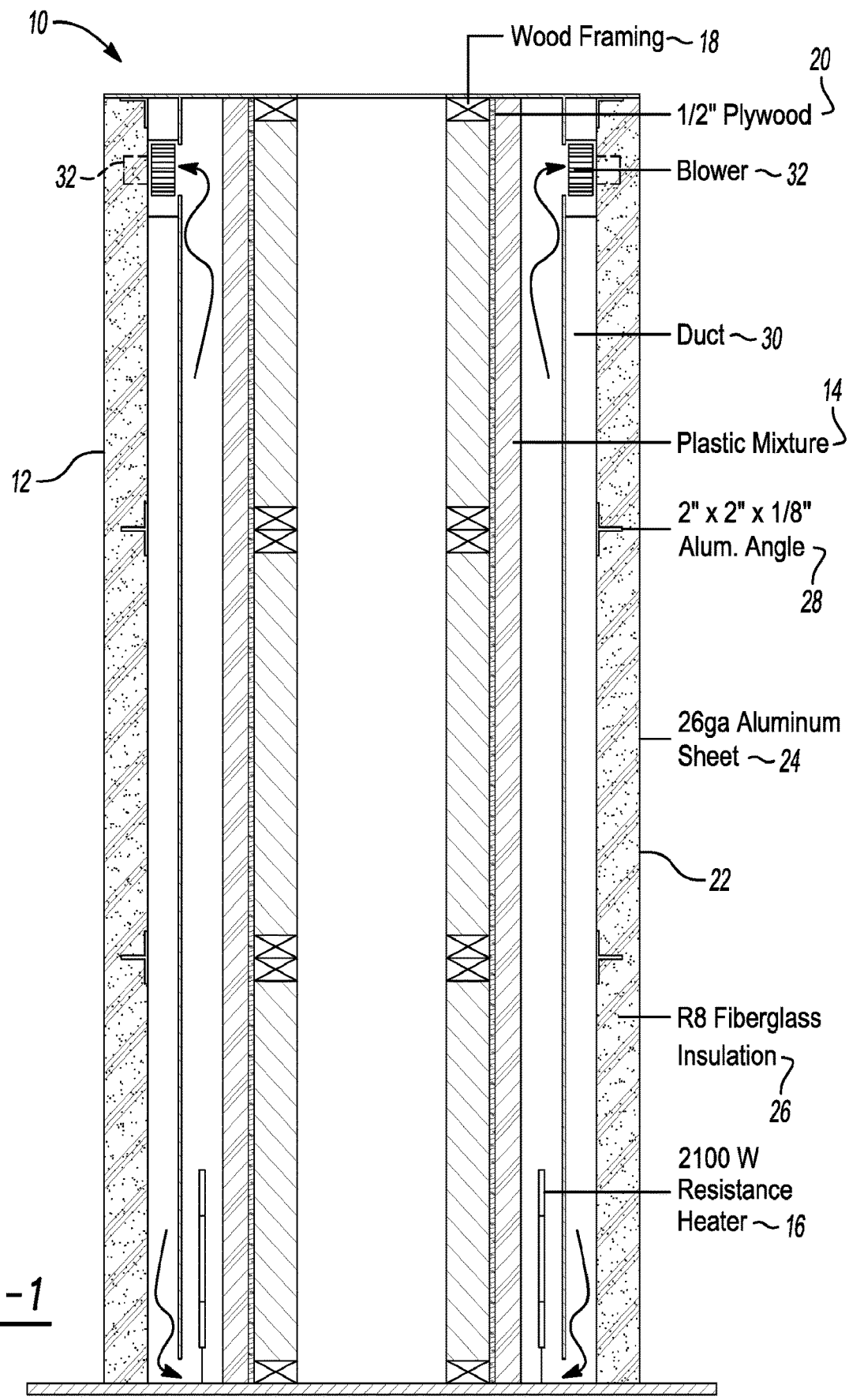
FIG. 1 is a cross-sectional view of a monolithic thermocasting system having exterior heating according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, in some embodiments freestanding columns are produced or fabricated from a mixture of polymer plastic and construction waste. There are a number of advantages according to the present teachings, including but not limited to monolithic thermocasting capable of overcoming the limitation on size that comes with traditional plastic production, the ability to cast on site (that is, the process does not rely on dedicated facilities that have scale limitations), large monolithic plastic objects achievable with rotational molding that is easily portable (i.e. only kayak sized), and the ability to use local materials in place of concrete casting, which requires complex control over inputs and greater demands on energy.

According to some embodiments, a process for monolithically thermocasting large scale columns is provided that can be scaled to much larger architectural elements like walls and roofs. This process includes the preparation of material mixtures, the fabricating of molds, and the application of heat.

According to the principles of the present teachings, a method is provide comprising preparing the materials, including sourcing, sorting, and mixing of polymer plastics and building construction waste. In some embodiments, the polymer plastics can comprise Polypropylene (PP) and Polyethylene (PE). However, other polymer plastics may also be used. These plastics can be obtained from two distinct sources. First, pre-processed plastics can come from local plastic recycling companies. These plastics are often already sorted by color and polymer and processed into shreds or pellets standard to the plastics industry. The remaining plastics can be obtained from multiple local sources, including construction sites, local government agencies, plant nurseries, and small farms. These plastics may be unsorted and unprocessed and thus require size reduction to fit into the mold cavity and adequately melt and adhere to the other inorganic materials. The construction waste can include broken brick, concrete rubble, plate glass shards, gravel, and sand, which can be obtained from local construction sites, construction material yards, and in the case of the glass, the plant where it is manufactured. All of these materials may require size reduction to fit into the mold cavity and to mix well with the polymers.

According to the principles of the present teachings, the mold fabrication can be based on existing modular systems used in concrete construction. In some embodiments the system, since it must contain melted polymer plastic, must withstand temperatures up to 425 degrees Fahrenheit. This means that all of the materials must be fire resistant and have melting and flash points well above 425 F. Where concrete mold panels typically use steel reinforced plywood for the mold wall, this material is not fire resistant nor would it conduct heat. Consequently the mold wall of the present teachings is fabricated from aluminum plate.

There are at least two methods for heating the plastic mixture in the mold—both involve convectively heating an insulated chamber of air adjacent to the aluminum mold wall. Each applied heat only to one side of the mold. Each heated a mold cavity that was 2" deep and filled with the plastic mixture. The two methods differ significantly, however, in the direction from which the heat was applied.

Figure 2:
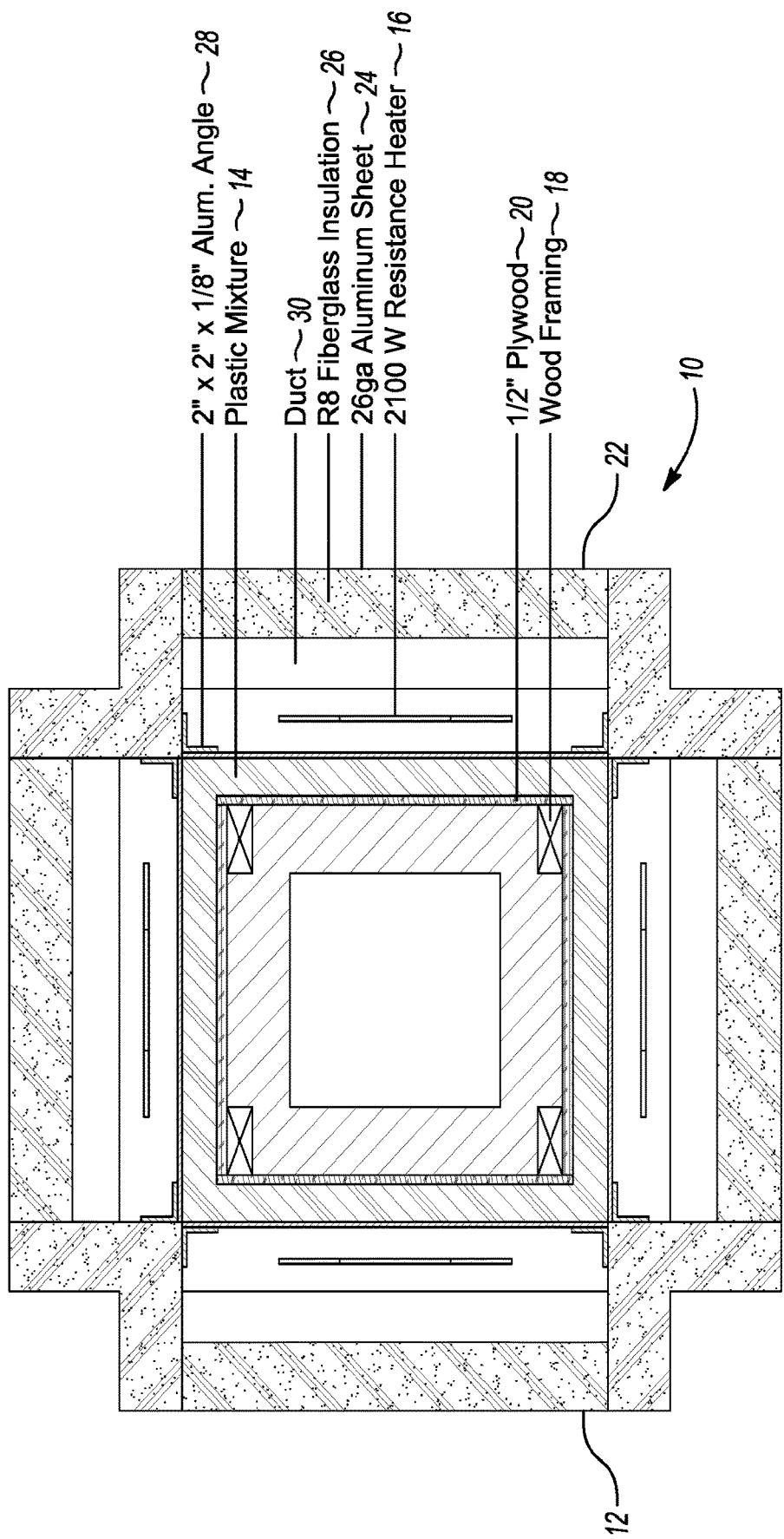
FIG. 2 is a top cross-sectional view of the monolithic thermocasting system having exterior heating according to the principles of the present teachings.

In some embodiments as illustrated in FIGS. 1-2, the exterior heated method consists of modular, heated mold panels that apply heat from the outside of the mold. By non-limiting example, the devices can measure approximately 24" wide by 6" deep by 96" high. Each panel can have a smooth surface that faces inward toward the material to be cast. Behind that surface is an insulated air cavity or duct. Each cavity is heated with an electrical resistance heating element. Convection is introduced with a centrifugal blower that ensures even heat distribution across the mold surface. Each unit is individually controlled with a Precision Programmable Temperature Controller (PID) and multiple thermocouples attached to the outer surface of the mold wall. The system has been tested with injection molding grade polymers, but could hypothetically be used with any thermoplastic polymer with sufficient melt flow index. A high melt flow is required because the process relies on gravity to flow plastic into the mold.

More particularly, in some embodiments, thermocasting system 10 can comprise one or more panel sections 12 being integrally formed or joined to define a mold cavity 14. The thermocasting system 10 can comprise one or more heating elements 16, such as resistance heaters (2100 W), for outputting thermal energy in response to a control signal. With particular reference to the exterior heated system of FIGS. 1-2, thermocasting system 10 can be arranged having an internal framing 18, such as a wood frame, being covered by a surface member 20, such as ½" plywood. An exterior framing system 22 can comprise aluminum sheets 24, an insulation member 26, and angle members 28 arranged to form ducts or air cavities 30 therebetween. Heating elements 16 can be positioned within ducts 30. Mold cavity 14 can be thus defined between interior framing 18 and exterior framing 22/ducts 30 into which the plastic and solid material composition can be deposited and thermocast to closely conform to the mold cavity 14. One or more blowers 32 can be used to distribute the thermal energy from heating elements 16 evenly throughout mold cavity 14 and/or duct 30.

Figure 3:
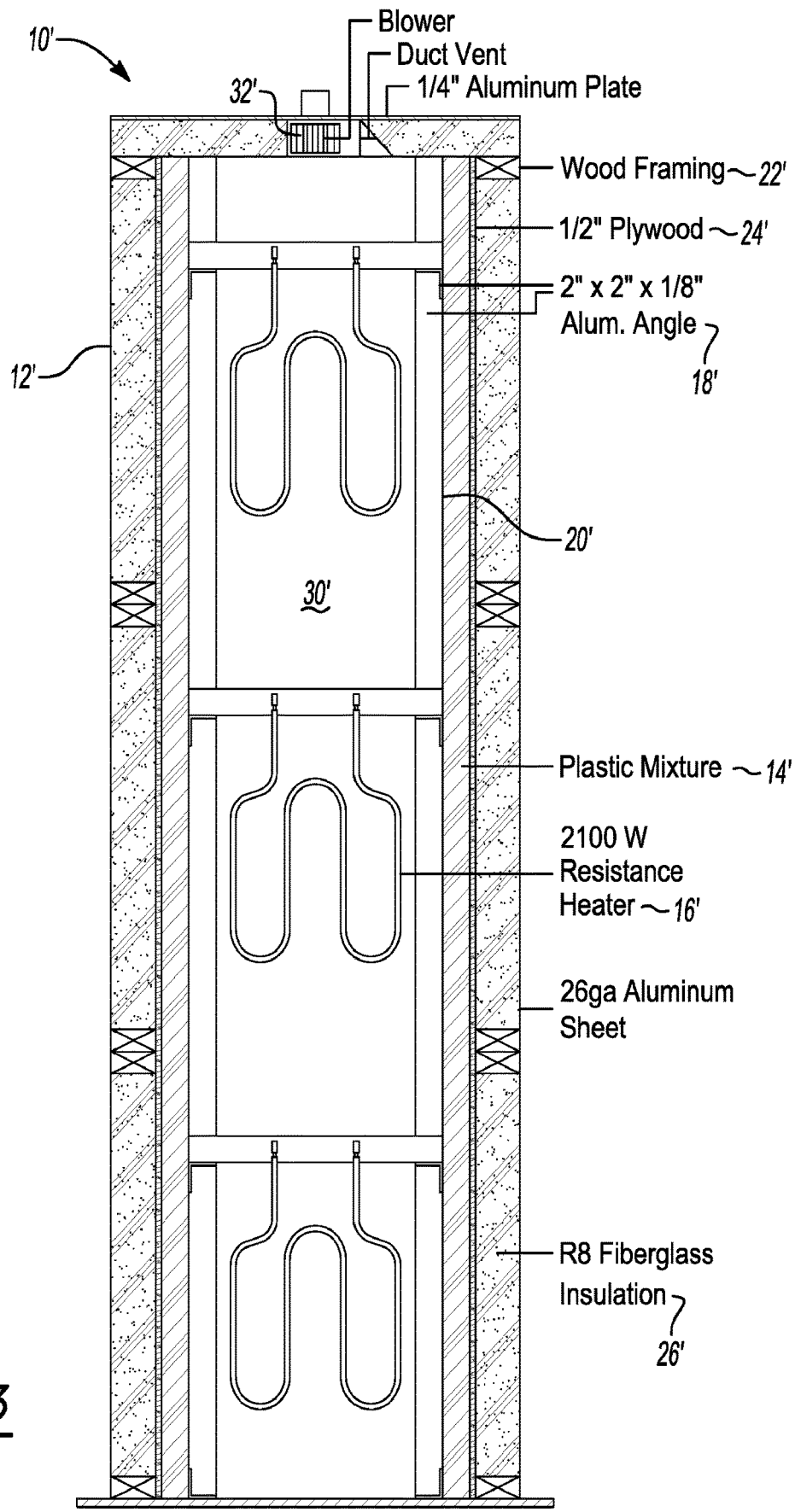
FIG. 3 is a cross-sectional view of the monolithic thermocasting system having interior heating according to the principles of the present teachings.
Figure 4:
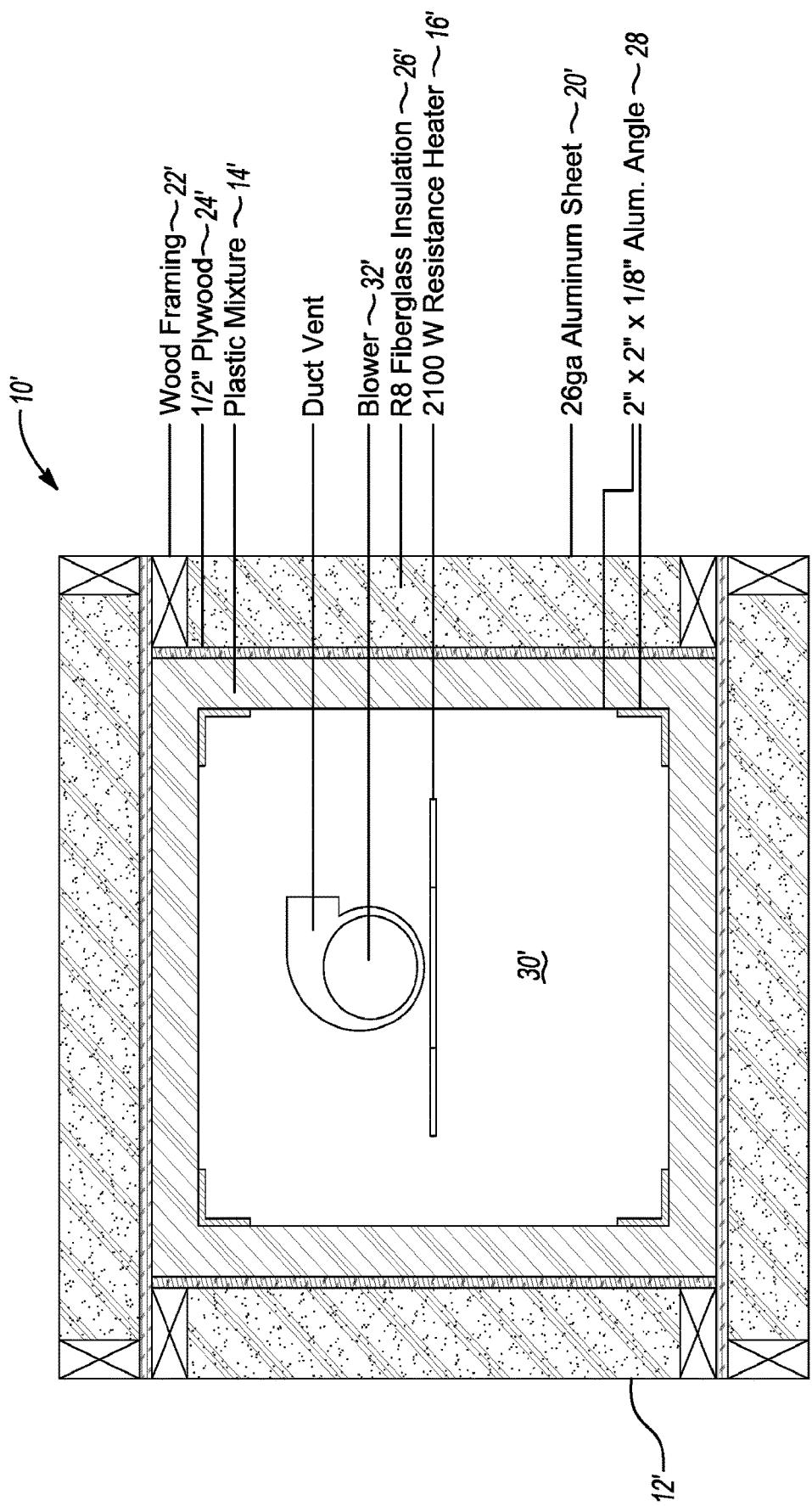
FIG. 4 is a top cross-sectional view of the monolithic thermocasting system having interior heating according to the principles of the present teachings.

As illustrated in FIGS. 3-4, an interior heated system and method is illustrated that applies heat from the inside of a closed mold with the plastic material itself acting as insulation. It is otherwise similar to the exterior heated method in that it consists of smooth mold walls made of aluminum, an air cavity heated by convection and controlled by a PID. In some embodiments, the embodiment employing the interior heating method produced a column prototype that is 10'6" tall and approximately 24"×24" in plan. It should be understood that the disclosed dimensions can be varied. The interior surface was completely melted and therefore smooth and even. The exterior surface was not completely melted and was therefore rough and uneven, revealing the form and texture of the material fragments that constitute the mixture.

More particularly, in some embodiments, thermocasting system 10' can comprise one or more panel sections 12' being integrally formed or joined to define a mold cavity 14'. The thermocasting system 10' can comprise one or more heating elements 16', such as resistance heaters (2100 W), for outputting thermal energy in response to a control signal. With particular reference to the interior heated system of FIGS. 3-4, thermocasting system 10' can be arranged having an internal framing 18', such as an aluminum frame, being covered by a surface member 20', such as aluminum. An exterior framing system 22' can comprise a wood frame and plywood sheets 24', an insulation member 26'. The internal framing 18' can be arranged to form a central duct or air cavity 30'. Heating elements 16' can be positioned within duct 30'. Mold cavity 14' can be thus defined between interior framing 18 and exterior framing 22 into which the plastic and solid material composition can be deposited and thermocast to closely conform to the mold cavity 14'. One or more blowers 32' can be used to distribute the thermal energy from heating elements 16' evenly throughout mold cavity 14' and/or duct 30'.

In some embodiments, the exterior heating system and method can produce a column prototype that is 8'0" tall and approximately 24"×24" in plan. It should be understood that the disclosed dimensions can be varied. Like the interior heating method, the surface against the mold wall was completely melted and the other surface remained unmelted and rough. The aesthetic impact of each column is therefore very different. One looks like a pile of waste and rubble while the other appears to be made of cut and polished marble.

The present teachings demonstrate that monolithically thermocasting polymer mixtures for architectural applications is achievable. However, in some embodiments, addition features are envisioned. It should be understood that although the present teachings employ polymers that are both strong and heavy, they may not provide sufficient fire resistance in all applications. Therefore, this may limit use to building enclosure systems and one-story outdoor pavilions, until further material science modifications are completed. Additionally, it should be understood that in large structures, a plurality of mold panels will be heated simultaneously. To avoid excessive use of energy and increased complexity, efficiency can be improved through better insulation, thermal isolation of mold wall from mold cavity, and analysis of heat flow to better calibrate heat source locations.

As should be appreciated from the foregoing, the present teachings provide a system and method for monolithically thermocasting large, hollow building components. That is, the present disclosure provides a method for making free-standing, hollow columns; each with four walls cast as one monolithic structure while the tops and bottoms remained open. However, according to the principles of the present teachings, it is also anticipated that alternative enclosed shapes can be constructed resulting in thermocasting hollow modular units that are completely enclosed (e.g. six sides).

Figure 5:
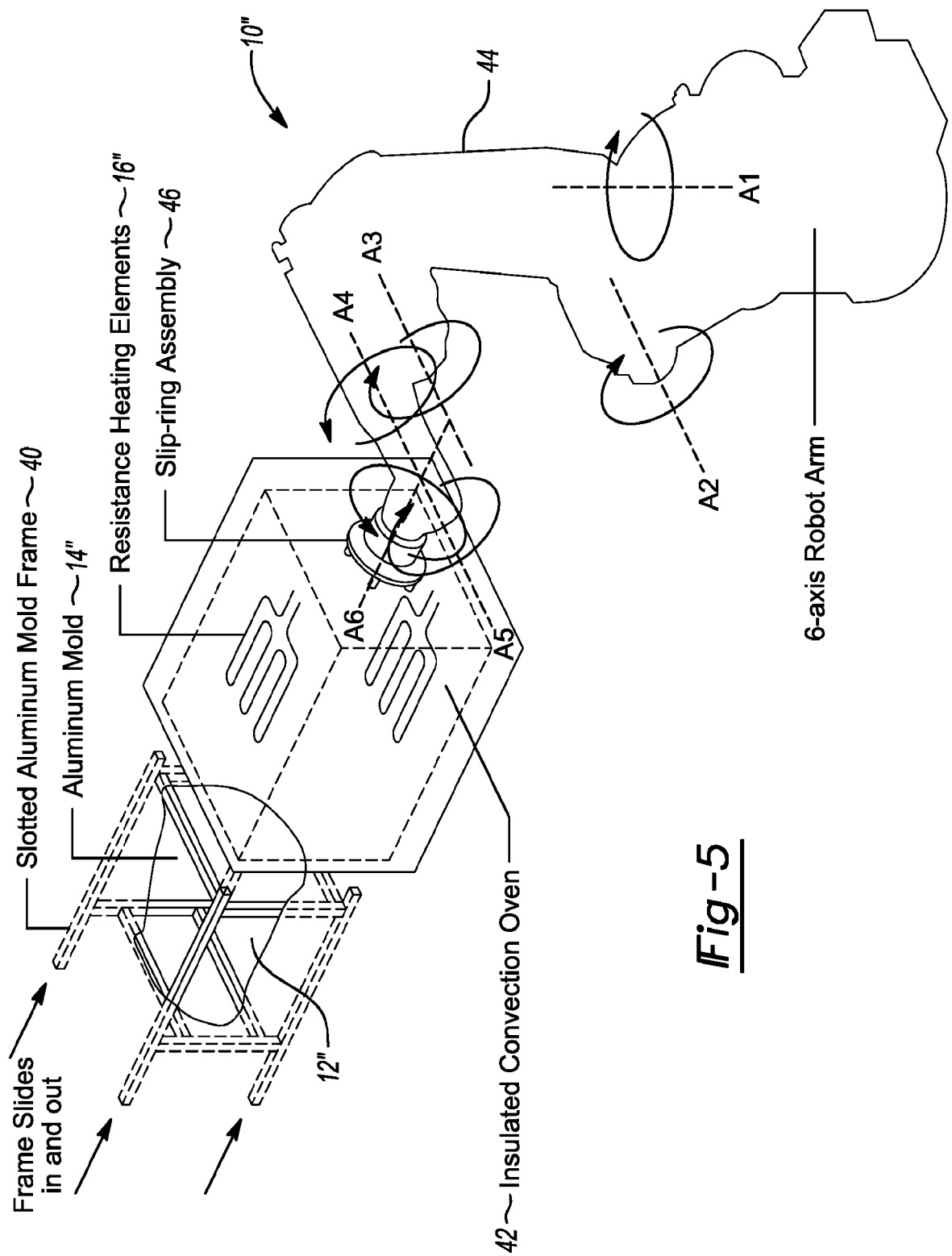
FIG. 5 is a perspective view of a thermocasting system having a manipulating device to manipulate the mold according to principles of the present teachings.

In some embodiments as illustrated in FIG. 5, a method employing rotational molding is disclosed using a low-pressure process that uses gravity and rotational forces to distribute the mold's contents to its outer walls that give the object shape. In some embodiments, a thermocasting system is provided having a manipulating device to rotate the mold cavity simultaneously with the heating elements thereby thermocasting the polymer and solid material. According to the principles of the present teachings, by carefully programming the device's speed and movements, one is able to control the resulting surface patterns of different colored polymers and aggregates melting together. The wall thickness of the resulting hollow object can also be controlled by the duration of heating and the programmed movements of the device.

More particularly, in some embodiments, thermocasting system 10" can comprise a plurality of panel sections 12" being integrally formed or joined to define an enclosed mold cavity 14". The mold cavity 14" can be sized and shaped as desired to define an enclosed volume having an orifice for inserting polymers and, in some embodiments, aggregates therein. The mold cavity 14" can be supported by a slotted aluminum mold frame 40 that is sized and configured to slide the frame 40 and mold cavity 14" into a convection oven 42 having one or more heating elements 16", such as resistance heaters (2100 W), for outputting thermal energy in response to a control signal. Due to the configuration of the mold cavity to the sliding frame, the orifice in the mold cavity can be accessed during the process to add additional polymers and aggregates. Convection oven 42 can be configured to partially or completely surround and heat mold cavity 14". Mold cavity 14" can be thus defined such that the plastic and solid material composition can be deposited and thermocast to closely conform to the mold cavity 14'. In some embodiments, a robotic arm or other manipulation device 44, such as a 6-axis robotic arm, can be coupled to convection oven 42 to permit manipulation and/or rotation of convection oven 42 during use, thereby rotating the mold cavity simultaneously with the heating elements for thermocasting the polymer and solid material. In some embodiments, robotic arm 44 is coupled to convection oven 42 via a slip-ring assembly 46.

According to the present teachings, embodiments are disclosed that use a mixture of waste polymers and mineral aggregates to form a desired structure. In some embodiments, these polymers can comprise polyolefins (including polyethelene and polypropolene). Moreover, embodiments are disclosed that employ low-pressure and use gravity to distribute the flowing material when heated. The patterning visible on the surface of the final cast product is a result of gravity acting on the materials when heated. In some embodiments employing robotic arm 42, additional control and variation of the surface patterning can be obtained since the mold's orientation shifts throughout the heating period. Still further, embodiments are disclosed that utilize aluminum molds designed to contain the polymer-aggregate mixture during the heating process and give it shape. In some embodiments herein, an exterior and interior frame system is used to create a hollow product. The heated molds can be place either on the exterior or interior to produce different surface textures. Conversely, in some embodiments, only an exterior mold is required that forms hollow members via rotation that distributes the material to the outside edges of the mold. According to these teachings, an airspace that is heated convectively efficiently and evenly applies heat over the surface of the mold. In some embodiments, only the portions of the mold that are being heated at a given time require this convective layer; the mold assembly is moved up as the lower portions cool and become structurally stable. However, in some embodiments, the entire mold is contained within a heated airspace. This assembly is attached to a programmable device that rotates and moves.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A monolithic thermocasting system for thermocasting polymer and solid material, the monolithic thermocasting system comprising:
    an internal frame system having an internal hollow duct;
    an external frame system disposed external to the internal frame system;
    a mold cavity formed between the internal frame system and the external frame system, the mold cavity sized to receive the polymer and solid material and shaped to form a hollow architectural member;
    and
    a heater element disposed in the internal hollow duct configured for outputting thermal energy to the mold cavity via at least the internal frame system to heat the polymer and solid material, the thermal energy being sufficient to thermocast the polymer and solid material to a combined building material.

2. The monolithic thermocasting system according to claim 1, wherein the internal frame system comprises a metallic frame and surface system.

3. The monolithic thermocasting system according to claim 1, wherein the internal frame system comprises a wood-based frame and surface system.

4. The monolithic thermocasting system according to claim 1, wherein the external frame system comprises an insulation member.

5. The monolithic thermocasting system according to claim 1, wherein the external frame system comprises a metallic frame and surface system.

6. The monolithic thermocasting system according to claim 1, wherein the external frame system comprises a wood-based frame and surface system.

7. The monolithic thermocasting system according to claim 1 further comprising a blower in fluid communication with the internal hollow duct to distribute the thermal energy within at least one of the duct and the mold cavity.

8. A method of monolithic thermocasting of a combination polymer and solid material for architectural purposes, the method comprising:
    obtaining a polymer;
    obtaining a solid material;
    combining the polymer and the solid material to form a combination mixture;
    inserting the combination mixture within a mold cavity of a monolithic thermocasting system, the monolithic thermocasting system having an internal frame system having an internal hollow duct, an external frame system disposed external to the internal frame system, the mold cavity formed between the internal frame system and the external frame system; and
    applying heat within the internal hollow duct of the internal frame system to heat the mold cavity to a temperature sufficient to transition the polymer to a liquid phase to produce a conglomerate of polymer and solid material.

9. The method according to claim 8 wherein the polymer is at least partially recycled polymer.

10. The method according to claim 8 wherein the polymer is chosen from the group consisting of Polypropylene (PP) and Polyethylene (PE).

11. The method according to claim 8 wherein the solid material is chosen from the group consisting of broken brick, concrete rubble, plate glass shards, gravel, and sand.

12. A thermocasting system for thermocasting polymer and solid material, the thermocasting system comprising:
    a mold cavity sized to receive the polymer and solid material and shaped to form an architectural member, the mold cavity being formed between an internal frame system having an internal hollow duct and an external frame system disposed external to the internal frame system;
    a heater element disposed within the internal hollow duct of the internal frame system configured for outputting thermal energy to the mold cavity to heat the polymer and solid material, the thermal energy being sufficient to thermocast the polymer and solid material to a combined building material; and
    a manipulation device configured to rotate the mold cavity and heater element simultaneously with thermocasting the polymer and solid material.

* * * * *